United States Patent [19]

Koto

[11] 4,443,807

[45] Apr. 17, 1984

[54] INK JET PRINT HEAD

[75] Inventor: Haruhiko Koto, Shiojiri, Japan

[73] Assignees: Epson Corporation, Nagano; Kabushiki Kaisha Suwa Seikosha, Tokyo, both of Japan

[21] Appl. No.: 325,153

[22] Filed: Nov. 25, 1981

[30] Foreign Application Priority Data

Nov. 28, 1980 [JP] Japan ............................... 55-168719

[51] Int. Cl.$^{3}$ ............................................ G01D 15/18

[52] U.S. Cl. ............................................... 346/140 R

[58] Field of Search ................................ 346/140 PD

[56] References Cited

U.S. PATENT DOCUMENTS 4,189,734 2/1980 Kyser et al. ................ 346/140 R X 4,364,066 12/1982 Koto .............................. 346/140 R 4,364,067 12/1982 Koto et al. ...................... 346/140 R

*Primary Examiner*—George H. Miller, Jr.

*Attorney, Agent, or Firm*—Blum, Kaplan, Friedman, Silberman & Beran

[57] ABSTRACT

An ink jet print head for projecting droplets of ink on demand includes a pressurization chamber including at least one wall defining a vibratory plate. A nozzle is open to the pressurization chamber and defines a fluid passage through which ink is ejected. A piezoelectric element is operatively coupled to the vibratory plate which is selectively energized to vibrate the wall thereby changing the volume of the pressurization chamber to eject ink through the nozzle. A vibratory system is defined by the piezoelectric element and the vibratory plate with the acoustic capacitance of the vibratory system being less than or equal to $9\times10^{-17}$ $m^5/N$.

15 Claims, 14 Drawing Figures

FIG. 1A
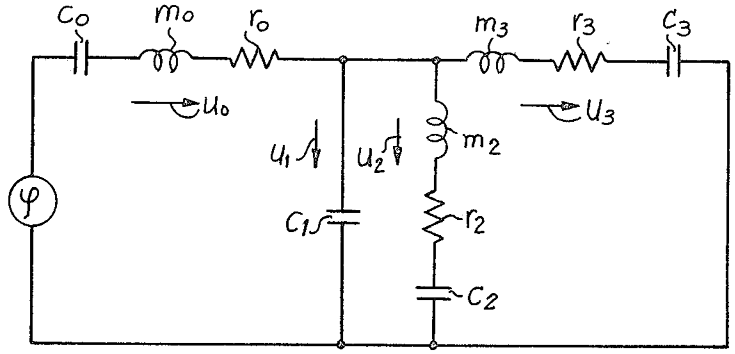
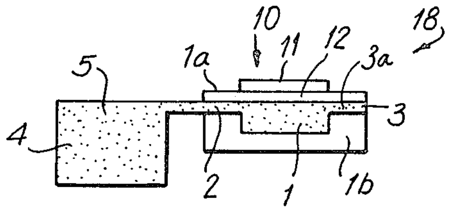
FIG. 1B
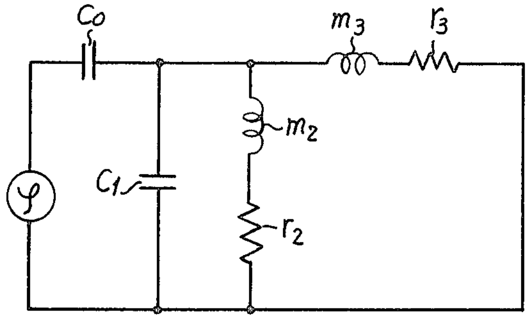
FIG. 2

FIG. 3A
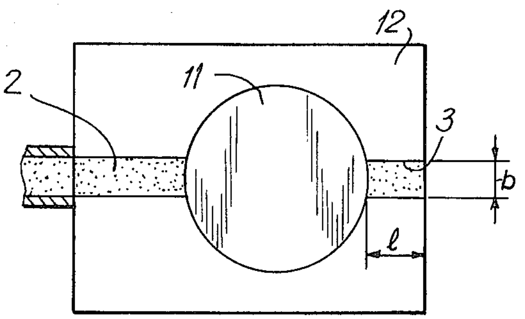
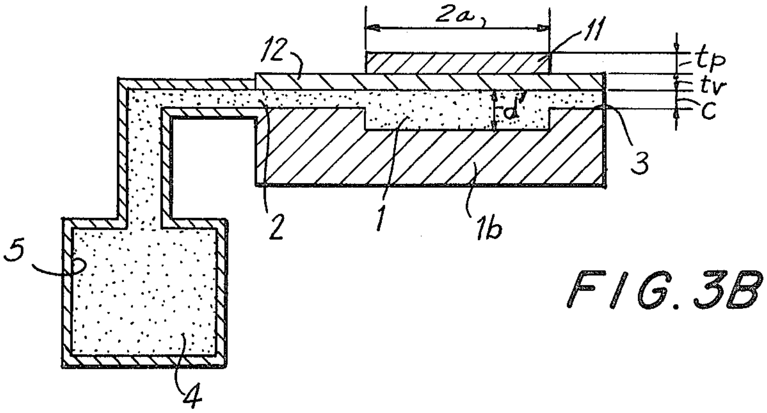
FIG. 3B
FIG. 4A
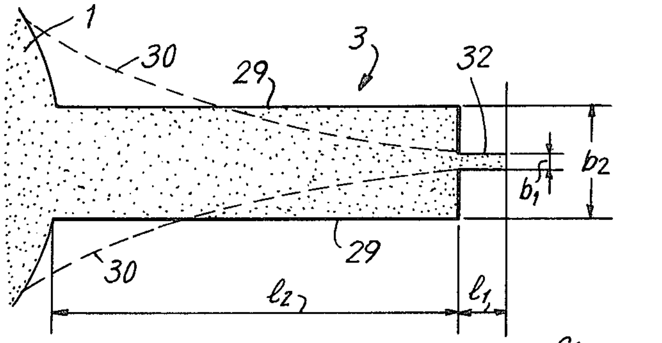
FIG. 4B
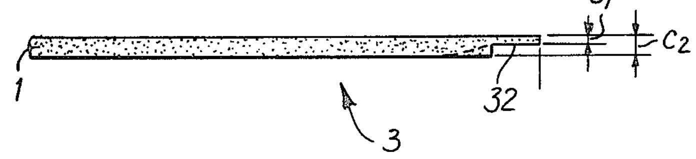

INK JET PRINT HEAD

BACKGROUND OF THE INVENTION

The present invention is directed to a small-sized print head and, in particular, to a small-sized ink jet print head for use in an ink-on-demand printer.

Ink jet print heads for use in ink-on-demand type printers are gaining increasing acceptance. Such ink jet print heads include a pressurization chamber, the volume of which is reduced by mechanical distortion caused by a piezoelectric element, in order to eject droplets of liquid ink through a nozzle communicating with the pressurization chamber. The energy required for printing in ink jet print heads is small and such print heads can be provided with multiple nozzles. Although the structure of ink jet print heads which eject ink droplets is relatively uncomplicated, such print heads have not been completely theoretically analyzed since ink ejection is produced under transient conditions and the pressure, rate of flow and the like are difficult to measure due to the small size of the print head.

In highly compact multiple-nozzle print heads wherein, for example, twenty-four (24) or more nozzles are required for printing Chinese characters, each individual pressurization chamber and associated piezoelectric element should preferrably be small in size. However, heretofore, it has not been clear as to how the pressurization chamber can be reduced in size due to incomplete theoretical analysis. Piezoelectric elements have been utilized having a thickness $tp \approx 0.3$ mm or more and a diameter $d \approx 5$ mm or greater. Furthermore, piezoelectric elements which are small in size generate a small driving power and require an increased drive voltage thereby making such elements practically infeasible.

For example, Stemme et al in IEEE, Transaction on Electron Devices, ED-20 No. 1,14(1973) suggested the arrangement where $tp=0.3$ mm and $d=5$ mm. In preprint No. 6, preprint collection for the 8th National Conference, 1980, of the Picture Image Electronics Society, Matsuda et al. disclosed that a rectangular piezoelectric element having $tp=0.3$ mm has the best ratio of mechanical distortion. The size of such a piezoelectric element is assumed to be about 2 mm×15 mm and, hence, such a large sized piezoelectric element is unsatisfactory where it is desired to reduce the size of the piezoelectric elements.

The larger the area of the piezoelectric element, the higher the cost becomes for a substrate constituting the piezoelectric element and the print head. A highly compact ink jet print head is therefore disadvantageous since it comprises a number of piezoelectric elements. With multiple nozzles, an increase in the size of a piezoelectric element results in a greater distance between the distal end of the nozzles and the pressurization chamber and hence, in an increased resistance in the flow passage. Such an increased flow resistance, in turn, necessitates an increase in the area of the piezoelectric element to gain a greater driving power, a disadvantage caused by the size and driving power of the piezoelectric elements. Accordingly, an ink jet print head which is small in size without requiring an increased drive voltage to operate, is extremely desired.

SUMMARY OF THE INVENTION

Generally speaking, in accordance with the instant invention, a small-sized ink jet print head of the ink-on-demand type which requires a reduced drive voltage, is provided.

The ink jet print head includes a pressurization chamber including at least one wall. A nozzle is open to the pressurization chamber and defines a fluid passage through which ink is ejected. A vibratory system includes a vibratory plate defined by the wall of the pressurization chamber and a piezoelectric element which is coupled to the vibratory plate to vibrate same thereby altering the volume of the pressurization chamber to cause ink to be ejected through the nozzle.

The acoustic capacitance of the vibratory system defined by the piezoelectric element and the vibratory plate is less than or equal to $9\times10^{-17}$ $m^5/N$. With such an acoustic capacitance, the voltage required to drive the piezoelectric element is kept to a minimum.

Accordingly, it is an object of the present invention to provide a small-sized ink jet print head which requires an optimum minimum drive voltage to operate.

Another object of the present invention is to provide a multi-nozzle ink jet print head having a high efficiency with no accompanying increased resistance in the flow passages.

Still another object of the present invention is to provide an ink jet print head which is less costly to manufacture.

Yet another object of the present invention is to provide an ink jet print head which is specifically designed to be small in size yet which is constructed to operate at a minimum drive voltage.

Still other objects and advantages of the invention will in part be obvious and will in part be apparent from the specification.

The invention accordingly comprises the features of construction, combination of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 1A is an equivalent schematic circuit diagram depicting the principles of operation of the ink jet print head of the present invention;

FIG. 1B is a schematic side elevational view of an ink jet print head constructed in accordance with the present invention;

FIG. 2 is a simplified equivalent schematic circuit diagram depicting the principles of operation of the present invention;

FIG. 3A is a partial top plan view of the ink jet print head depicting the dimensions thereof;

FIG. 3B is a side elevational view of the print head depicted in FIG. 3A depicting the dimensions thereof;

FIG. 4A is an enlarged top plan view of the nozzle of the print head of the present invention;

FIG. 4B is an enlarged side elevational view of the nozzle depicted in FIG. 4A showing the dimensions thereof;

DESCRIPTION OF THE PREFERRED EMBODIMENTS

Figure 5A:
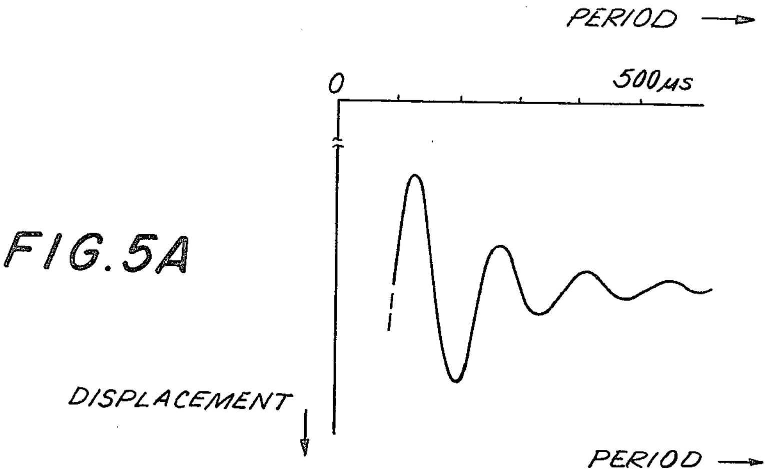
FIG. 5A is a graph depicting the oscillatory waveform of a PZT piezoelectric element in an actual ink jet print head.

Reference is first made to FIG. 1A which depicts an equivalent electric circuit model of the ink jet print head depicted in FIG. 1B. The circuit includes inertances $m_0$, $m_2$ and $m_3$, acoustic capacitances $C_0$, $C_1$, $C_2$ and $C_3$ and acoustic resistances $r_0$, $r_2$ and $r_3$.

FIG. 1B schematically depicts the construction of an ink jet print head, generally indicated at 18 constructed in accordance with the present invention. Print head 18 includes a pressurization chamber 1 defining top wall 1*a* and bottom wall 1*b*. A nozzle 3 is open to pressurization chamber 1 and defines a fluid passage 3*a* through which ink 4 travels from pressurization chamber 1 and is ejected out of nozzle 3. A piezoelectric element 11 is coupled to wall 1*a* so that wall 1*a* acts as a vibratory plate 12 for piezoelectric element 11. Piezoelectric element 11 and vibratory plate 12 define a vibratory system, generally indicated at 10. Print head 18 also includes an ink storage chamber 5 coupled to pressurization chamber 1 through a supply passage 2.

Ink 4 is supplied to nozzle 3 from pressurization chamber 1 by selectively energizing piezoelectric element 11 by a drive voltage. The energization of piezoelectric element 11 causes vibratory plate 12 to vibrate thereby altering the volume of pressurization chamber 1 which in turn creates a change in pressure within pressurization chamber 1. This change in pressure causes droplets of ink 4 to be ejected through nozzle 3 and onto a printing medium (not shown).

The subscripts of C, m, r and u in FIG. 1A refer to the circuit components defined thereby to the equivalent portions of print head 18 depicted in FIG. 1B referenced by corresponding numbers. The circuit depicted in FIG. 1A includes an acoustic capacitance $C_2$ of supply passage 2 and ink storage chamber 5, and a surface tension for nozzle 3 which is equivalent to an acoustic capacitance $C_3$ therefor. The subscript 0 refers to vibratory system 10. Units used herein are as follows: pressure ($\chi$), [$N/m^2$]; volume velocity (u), [$m^2/s$]; inertance (m), [$Kg/m^4$]; acoustic capacitance (C), [$m^5/N$]; and acoustic resistance (r), [$Ns/m^5$]. Actual experimental calculation of these constants indicates that the parameters $m_0$, $r_0$, $C_2$ and $C_3$ are negligible thereby resulting in the simplified equivalent electric circuit depicted in FIG. 2 with $m_0$, $r_0$, $C_2$ and $C_3$ is removed.

Although it is considerably difficult to theoretically analyze ink jet print heads of the ink-on-demand type, the present invention is a result of analysis of the equivalent circuit models depicted in FIGS. 1A and 2 and experiments relevant thereto. The present invention provides a piezoelectric element which is of such a small size that the size of a print head can be reduced while keeping the drive voltage of the element at a substantial minimum.

Assuming that $m_2=km_3$, $r_2=kr_3$ and the pressure $\chi$ is regarded as a step function, the damping coefficient can be expressed by the following expression:

$$D=r_3/2m_3 \quad 1,$$

with the angular frequency expressed as follows:

$$E=\sqrt{\frac{(1+1/k)}{m_3C}-D^2} \quad 2$$

and the damped oscillation can be expressed by the following equation:

$$u_3=\frac{\psi C_0}{m_3CE}\exp(-Dt)\sin Et \quad 3$$

$$\text{where } C=C_0+C_1. \quad 4$$

From equation 3, the required pressure $\chi$ is as follows:

$$\psi=\frac{VmAm_3C\sqrt{E^2+D^2}}{C_0\exp[-D\arctan(E/D)/E]}, \quad 5$$

where Vm is a necessary velocity and A is the cross-sectional area of the nozzle.

The volume of an ink droplet can be expressed by the following equation:

$$q=\frac{\psi C_0}{(1+1/k)}[1+\exp(-Dtm)], \quad 6$$

$$\text{where } tm=\frac{\pi}{E}. \quad 7$$

The drive voltage V of the piezoelectric element 11 can be expressed by the following equation:

$$V=\sqrt{\frac{2\psi^2C_0}{K^2Cp}}, \quad 8$$

where Cp is the capacitance of the piezoelectric element and K is a constant which ranged from 0.1 to 0.3 in experiments. The capacitance Cp can be expressed as follows:

$$Cp=\epsilon Sp/tp \quad 9$$

where $\epsilon$ is a dielectric constant, Sp is the area of the piezoelectric element and tp is the thickness of the piezoelectric element.

The constants for a disk-shaped piezoelectric element can be expressed as follows:

$$C_0=\frac{\pi a^6}{K_1Eptp^3+K_2Evtv^3}, \quad 10$$

$$C_1=\frac{\pi a^2d'}{vs^2\rho}, \quad 11$$

-continued $$r = \frac{32\eta l}{Sd^2} \quad 12$$

$$m = \frac{l\rho}{S}, \quad 13$$

where Ep is the modulus of longitudinal elasticity of the piezoelectric element, Ev is the modulus of the vibratory plate, $K_1$ and $K_2$ are constants, $K_1$ being about 5 and $K_2$ being in the range 10 to 20 in experiments, a is the radius of the piezoelectric element, tp is the thickness of the piezoelectric element, tv is the thickness of the vibratory plate, d' is the depth of the pressurization chamber, vs is the speed of sound in ink, $\rho$ is the density of ink, $\eta$ is the viscosity of ink, l is the length of the flow passage, S is the cross-sectional area of the flow passage, d is the diameter of the flow passage, which should be an equivalent diameter ($d \approx 2S/(b+c)$) for a rectangular cross section, and b and c are sides of the cross section of the flow passage. These constants are depicted in FIGS. 3A and 3B.

Examples are given below which were obtained by utilizing the above equations. FIGS. 4A and 4B depict the nozzle 3 of ink jet print head 18 in detail as made of glass and formed by etching. A flow passage indicated by dashed lines 30 and extending from pressurization chamber 1 to the tip 32 of nozzle 3 is approximated by a flow passage indicated by the solid lines 29. The equations 12 and 13 are used to obtain the following:

$b_1 = 80\ \mu m$, $C_1 = 30\ \mu m$, $l_1 = 250\ \mu m$, $b_2 = 300\ \mu m$, $C_2 = 100\ \mu m$, $l_2 = 2$ mm, when $\eta = 1.8$ cP, $\rho = 1{,}000\ kg/m^3$, $m_3 = 1.8 \times 10^8\ Kg/m^4$, and $r_3 = 3.3 \times 10^{12}\ Ns/m^5$.

Integration should be effected along the flow passage for greater accuracy, or m and r of minute proportions generated by smaller divisions should be added.

Figure 5B:
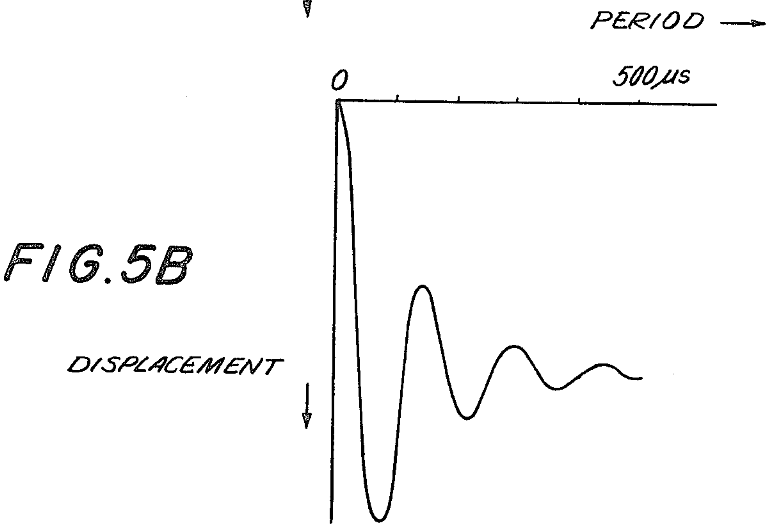
FIG. 5B is a graph depicting the expected oscillatory waveform of a PZT piezoelectric element in an ink jet print head.

FIG. 5A graphically depicts the oscillatory waveform of a PZT piezoelectric element in an actual operating ink jet print head. FIG. 5B depicts the expected oscillatory waveform obtained by theoretical calculation. The constants are as follows:

$a = 1.25$ mm, $k = 1.3$, $r_3 = 4 \times 10^{12}\ Ns/m^5$, $m_3 = 2.5 \times 10^8\ Kg/m^4$, $tp = tv = 0.15$ mm, $C_1 = 0.22 \times 10^{-18}\ m^5/N$, $C_0 = 3.45 \times 10^{-18}\ m^5/N$.

It should be understood that actual movement can be considerably accounted for although there are inconsistencies between measurment and calculation, such as a measured oscillatory period of about 140 $\mu$s and a calculated oscillatory period of about 146 $\mu$s. As for the measured oscillatory waveform in FIG. 5A, displacements for periods below 100 $\mu$s are not measured for the reason that the method of measurement was incomplete.

Figure 6:
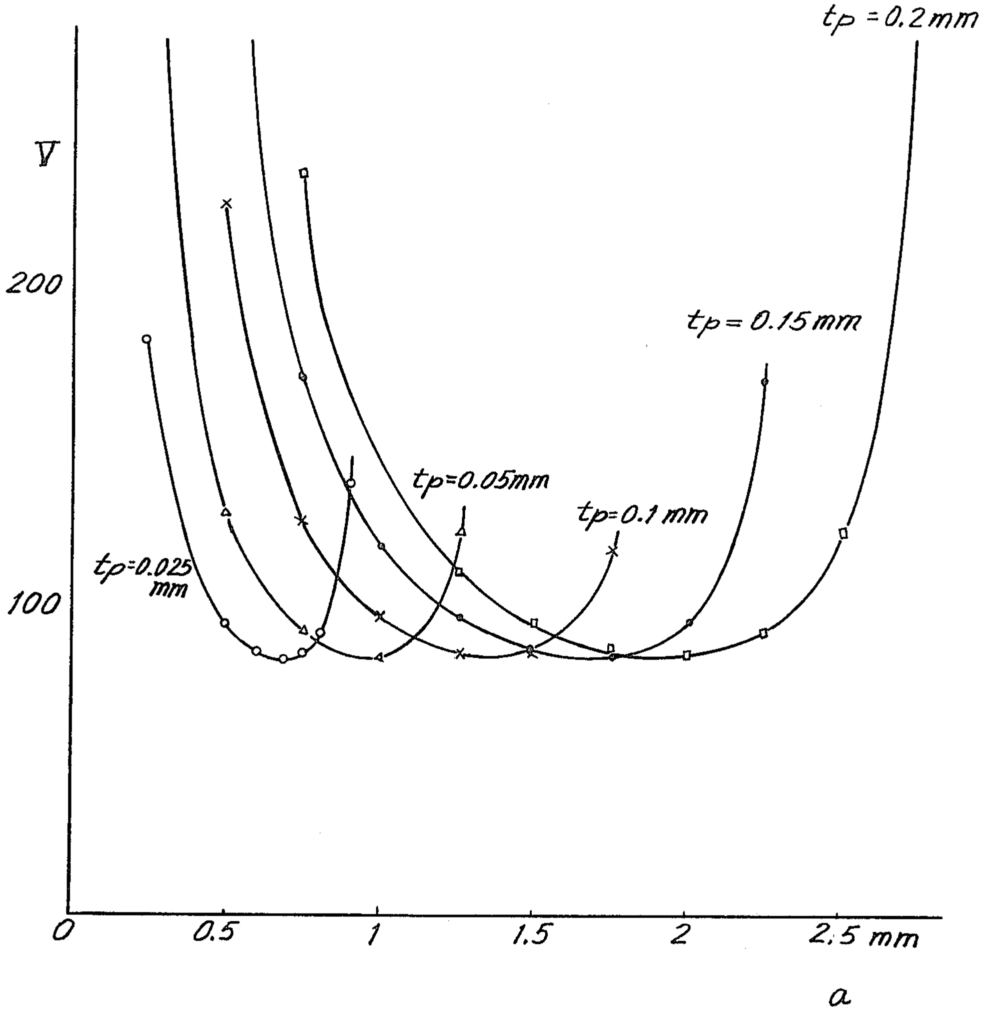
FIG. 6 is a graph depicting the calculated drive voltages of the piezoelectric element according to the present invention.

An embodiment of the present invention will now be described in which a piezoelectric element is rendered small in size by using the foregoing equations to calculate the optimum sizes thereof. Assuming that $m_3 \approx 2 \times 10^8 Kg/m^4$, $r_3 \approx 3 \times 10^{12} Ns/m^5$, $Vm = 5$ m/s, $A = 2.4 \times 10^{-9}\ m^2$, $K = 0.2$, $\epsilon = 2070 \times 8.854 \times 10^{-12}$ F/m, $Ep = 5.9 \times 10^{10}\ N/m^2$, $Ev = 7 \times 10^{10}\ N/m^2$, $K_1 = 4.4$, $K_2 = 11$, $d = 0.1$ mm, $Vs = 1460$ m/s and $k = 1$, the results of calculation for necessary drive voltages V as the thickness tp and radius a of the piezoelectric element vary with tp=tv are depicted in the graph of FIG. 6.

It will be seen from these results that there is an optimum radius a for the thickness tp of the piezoelectric element with m and r for the flow passage system being constant so as to effect printing at a minimum drive voltage and such minimum drive voltage being kept constant under such conditions.

These results will be considered from a different point of view. With $C_0$ fixed and under constant conditions for m and r of the flow passage system, $C_1 << C_0$ and hence $C \approx C_0$ in equation 4, and E is substantially constant with $C_0$ being fixed in equation 2. Therefore, $\chi$ is constant from equation 5. For a disk-shaped piezoelectric element, $$Cp = \epsilon \pi a^2 / tp \quad 9'$$

which is derived from equation 9 above. When tp=tv in equation 10, $a^6/tp^3$ is constant because of a fixed $C_0$, and Cp is also constant from equation 9'. Thus, on condition that $C_0$ is fixed in equation 8 and constants for the flow passage system are fixed, the other constants are substantially fixed and the drive voltage V is not varied.

This indicates that with $a^2/tp$ within a certain range, piezoelectric elements can be made smaller in size with no voltage increase associated therewith. From equation 6, the volume q of an ink droplet is substantially constant when $C_0$ is fixed.

Figure 7:
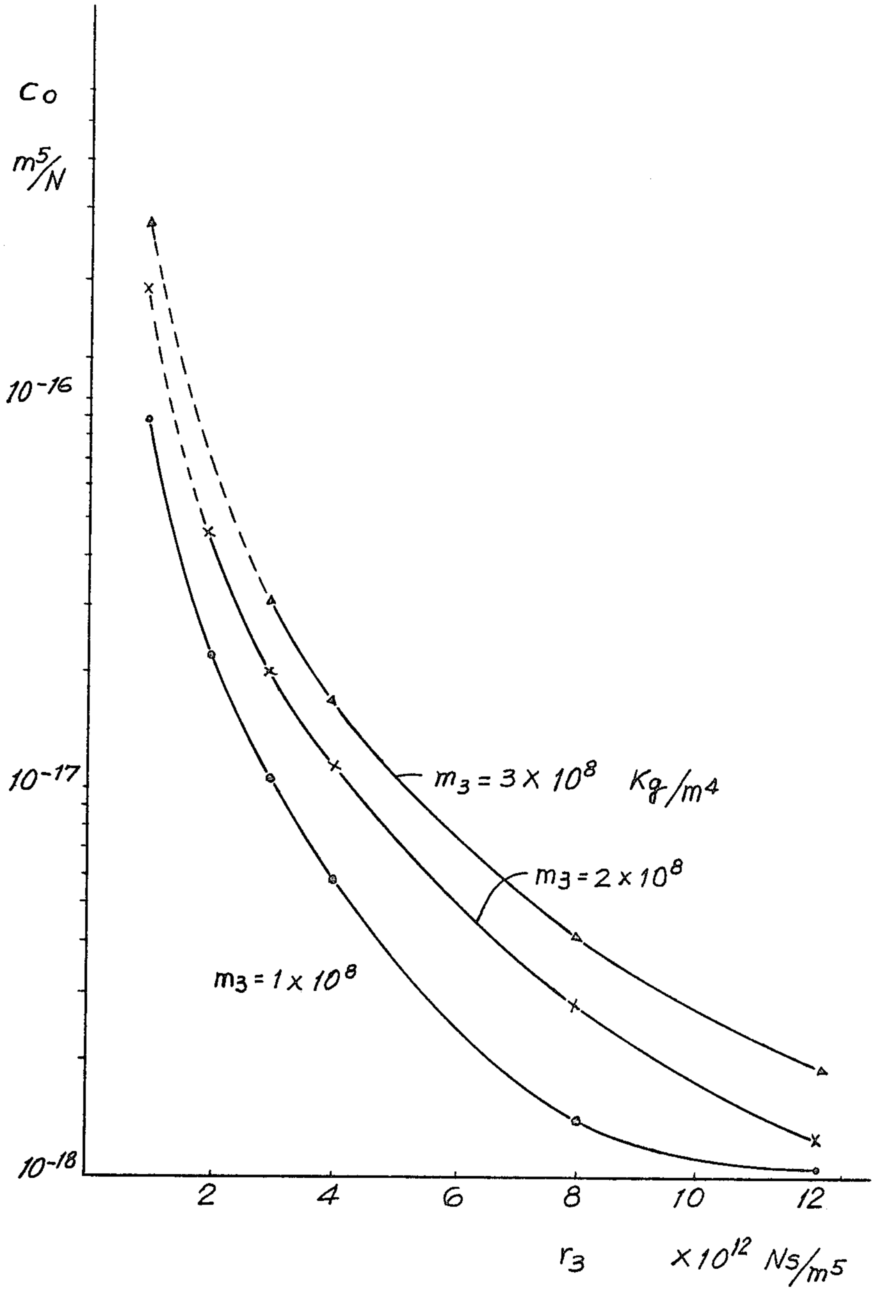
FIG. 7 is a graph depicting optimum acoustic capacitances calculated in accordance with the present invention.

Values of $C_0$ which minimize the drive voltage V in equation 8 under the same condition as in the graph in FIG. 6 and which are frequently used with ordinary flow passages are shown in FIG. 7 with $m_3$ varying from $1 \times 10^8 Kg/m^4$ to $3 \times 10^8 Kg/m^4$ and $r_3$ varying from $1 \times 10^{12} Ns/m^5$ to $12 \times 10^{12} Ns/m^5$. The drive voltage V can thus be held to a minimum by selecting such a vibratory system as has a value of $C_0$ shown in FIG. 7 when the flow passage system is determined.

Figure 8:
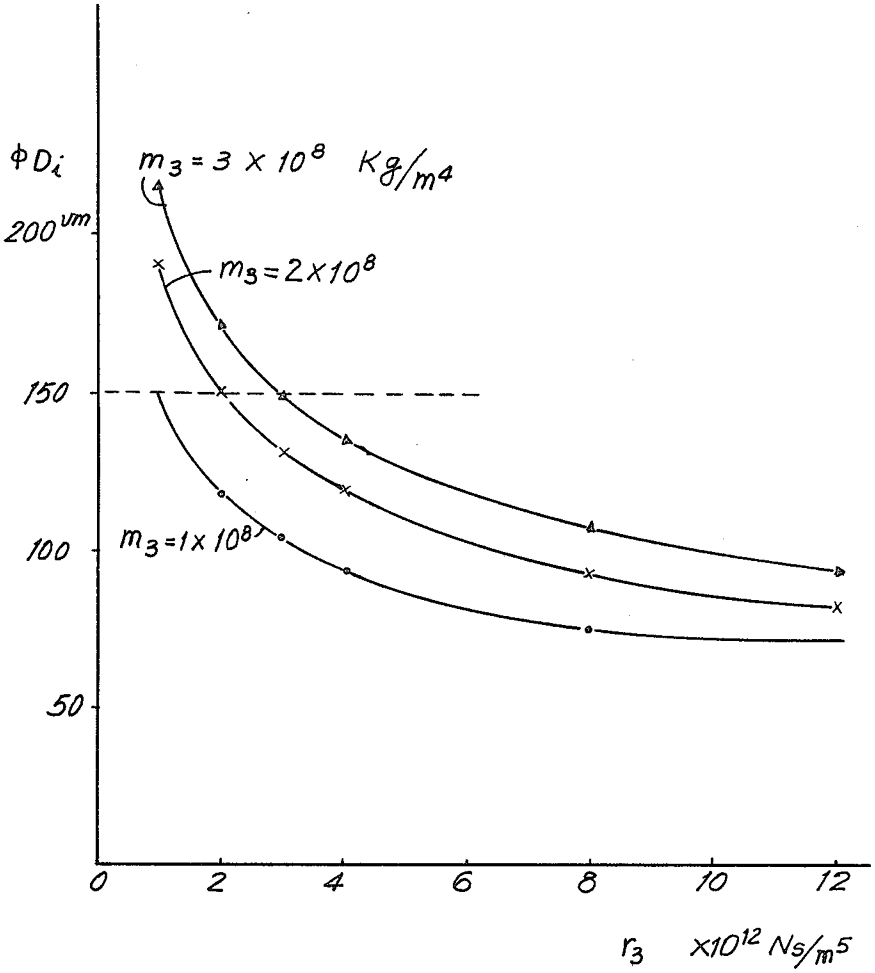
FIG. 8 is a graph depicting the diameters of ink droplets obtained under the acoustic capacitances depicted in FIG. 7.

The diameter Di of ink droplets under these conditions is depicted in FIG. 8. The diameter should preferably range from 50 $\mu$m to 150 $\mu$m. For high-density printing, for example, with twenty-four (24) nozzles, ink droplets having relatively large diameters are not preferable since they lower the quality of printing. Therefore, under the condition where $Di \leq 150\ \mu m$ in FIG. 8, $r \geq 2 \times 10^{12} Ns/m^5$ for $m_3 = 2 \times 10^8 Kg/m^4$ and $r \geq 3 \times 10^{12} Ns/m^5$ where $m_3 = 3 \times 10^8 Kg/m^4$, with the range indicated by the solid lines in FIG. 7 being perferable.

For flow passage systems within the range indicated in FIG. 7, the value of $C_0$ which minimizes the drive voltage is, based on the graph, in the range of:

$$1 \times 10^{-18}\ m^5/N \leq C_0 \leq 9 \times 10^{-17}\ m^5/N \quad 14.$$

A print head having a smaller $C_0$ for smaller diameter ink droplets is preferable for printing at a higher density.

There is an optimum relationship between tv and tp, for example, under the condition that the stress of the adhesive between the piezoelectric element and the vibratory plate is at a minimum and the durability of adhesion is best, if the relationship between tv and tp is as follows:

$$tv \approx \sqrt[3]{\frac{K_1 Ep}{K_2 Ev}} \cdot tp, \tag{15}$$

a good result can be obtained.

By substituting equation 15 for tv in equation 10, the following is obtained:

$$a = \left( \frac{2C_0 K_1 Ep tp^3}{\pi} \right)^{1/6}. \tag{16}$$

Equation 16 is substituted for $C_0$ in the equation 14 with $K_1=4.4$, $Ep=5.9\times 10^{10}$ N/m² to obtain:

$$0.074\sqrt{tp} \leqq a \leqq 0.16\sqrt{tp} \tag{17}$$

If tp=0.2 mm, then 1 mm$\leqq a \leqq$2.2 mm, if tp=0.15 mm, then 0.9 mm$\leqq a \leqq$2.0 mm, and if tp=0.1 mm, then 0.7 mm$\leqq a \leqq$1.6 mm.

It will be seen from these results that with a given flow passage system, the drive voltage can be minimized by selecting an optimum $C_0$ therefor which is determined by $a^6/tp^3$ and hence $a^2/tp$. The optimum radius a of a piezoelectric element is in the range expressed by the equation 17 for general flow passage systems as defined in FIG. 7. To reduce the radius a of a piezoelectric element, the thickness tp thereof may be reduced accordingly.

It is known that the thickness tp of PZT, for example, should not be smaller than about 0.1 mm for a required strength during machining and should not be smaller than about 0.15 mm for a required strength during assembly. Under the condition where $m_3=2\times 10^8$ Kg/m⁴, $r_3=3\times 10^{12}$ Ns/m⁵ in FIG. 6, FIG. 7 indicates that $C_0 \approx 2.1\times 10^{-17}$ m⁵/N for minimizing the drive voltage, and $a=0.123\sqrt{tp}$ from equation 16. The radius of a piezoelectric element for minimizing the drive voltage is:

$$a=1.5 \text{ mm for } tp=0.15 \text{ mm},$$

and $$a=1.2 \text{ mm for } tp=0.1 \text{ mm}.$$

The foregoing values are different from the radius a in FIG. 6 for minimizing the drive voltage because while tv=tp in FIG. 6, tv=0.7tp in the above calculation by substituting $K_1=4.4$, $Ep=5.9\times 10^{10}$, $K_2=11$, $Ev=7\times 10^{10}$ for those in equation 15. From equation 10, it should be noted that the radius a can be made smaller if tv=0. Practically, however, tv is optimum when it is of a value given by equation 15. When tv<<tp, equation 8 is no longer applicable and an increase in the drive voltage results since mechanical distortions of the piezoelectric element become ineffective for causing deflection of the vibratory plate.

The acoustic capacitance $C_0$ can be expressed as a ratio between a change of the volume of the pressurization chamber and a pressure applied to the chamber, but can be of a value different from that given by equation 10 depending on the configuration of the print head, the manner in which the piezoelectric element is bonded, the manner in which the vibratory plate is bonded, the material used to construct the vibratory plate, etc. For example, the value given by $$C_0 = \frac{\pi a^6}{K_1 Ep (tp + K_2 tv)^3}, \tag{10'}$$

may match experiments in some instances. Such experiments were conducted with $K_1 \approx 3$, $K_2 \approx 0.4$ or 1. Where the equation 10' is employed, the same reasoning can be used as with equation 10 if tv$\approx$tp.

In FIG. 6, no sharp rise in the drive voltage will occur with the radius a being about of a value minimizing the drive voltage for the thickness tp of the piezoelectric element and, hence, smaller radii can be selected. For example, in FIG. 6, while the optimum radius a for tp=0.15 mm is about 1.75 mm, $\alpha \approx 1.2$ mm when the drive voltage is allowed to increase from about 80 V to 100 V. Likewise, a$\approx$0.9 mm for tp$\approx$0.1 mm. The radius a may further be smaller than the value indicated if tv=0.7tp as with the arrangement graphically depicted in FIG. 7.

Another study of the thickness tp of a piezoelectric element for its lowest value will be described, for the smallest thickness possible for withstanding the drive voltage should be considered in addition to the foregoing smallest thickness considered from the standpoint of strength.

Figure 9:
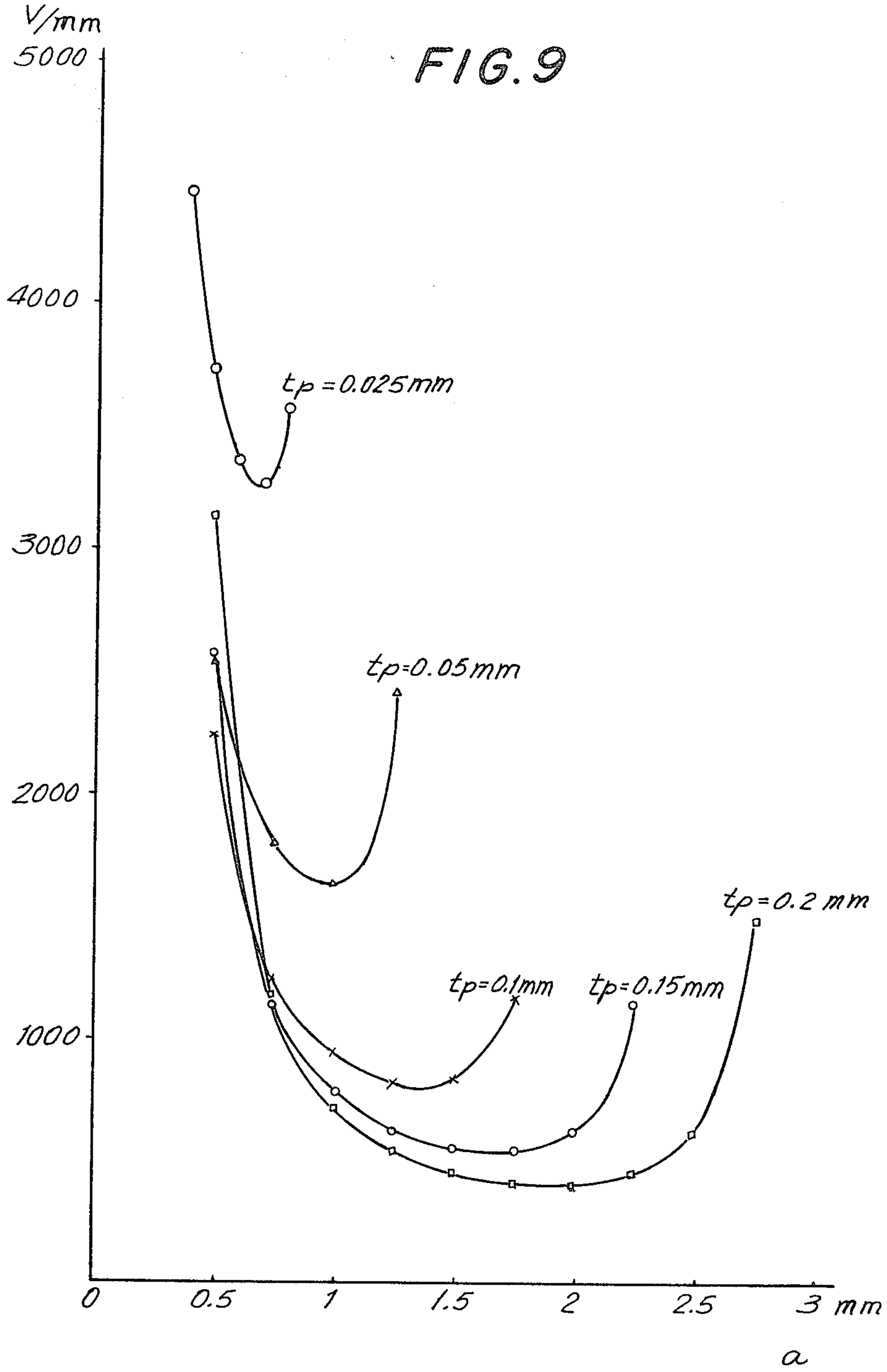
FIG. 9 is a graph depicting the intensities of an electric field calculated under the conditions presented by the graph in FIG. 6.

FIG. 9 depicts results of calculating the intensity V/tp of an electric field under the same conditions as in FIG. 6. Generally, the dielectric breakdown voltage for PZT is known to be from about 3000 V/mm to 4000 V/mm, and it can be used with tp=25 μm or tp=50 μm as seen in FIG. 9. Therefore, the radius a can be made smaller if and when piezoelectric elements having a thickness of 25 μm or 50 μm can be produced as the manufacturing process improves and progresses to more refined techniques.

Print heads of a reduced radius a can be manufactured with thin layers of PZT as produced by vapor deposition or sputtering. Since the voltage that a piezoelectric element can withstand is generally lowered as ambient humidity increases, however, print heads should be used in an electric field of 1000 V/mm or below for safe ink injection under the condition of high humidity. Under such a condition, the thickness of tp=50 μm cannot be employed, and the radius a should be as follows as seen from FIG. 9:

$$0.9 \text{ mm} \leqq a \leqq 1.7 \text{ mm for } tp=0.1 \text{ mm},$$

$$0.8 \text{ mm} \leqq a \leqq 2.2 \text{ mm for } tp=0.15 \text{ mm},$$

and $$0.8 \text{ mm} \leqq a \leqq 2.6 \text{ mm for } tp=0.2 \text{ mm}.$$

The foregoing results may be summarized as follows:

1. For a given flow passage system, a $C_0$ exists which minimizes the drive voltage.

2. $C_0$ is determined by $a^2/tp$. Therefore, tp may be made smaller to reduce a.

3. From the standpoint of withstanding voltages, tp should be 25 μm or greater. However, tp$\geqq$0.1 mm is preferable allowing for detrimental effects caused by humidity.

4. For a required strength during machining and handling, tp should be 0.1 mm or 0.15 mm, or greater, and to be safe, tp should be 0.2 mm or greater.

5. Optimum radii a are as follows:

$$1 \text{ mm} \leqq a \leqq 2.2 \text{ mm for } tp=0.2 \text{ mm};$$

$$0.9 \text{ mm} \leqq a \leqq 2.0 \text{ mm for } tp=0.15 \text{ mm},$$

and, $$0.7 \text{ mm} \leqq a \leqq 1.6 \text{ mm for } tp=0.1 \text{ mm}.$$

6. A radius a can be selected which is smaller than those indicated in ¶5 above if a small increase in the drive voltage is allowable.

While in the above description, the piezoelectric element and presssurization chamber are in the form of a disk, they may be elliptical, polygonal or the like although equation 10 and related equations need to be changed to reflect such modifications. Where the piezoelectric element is in the form of a narrow rectangle, its rigidity is increased with a resulting reduction in $C_0$ and, hence, the piezoelectric element should be thinner or greater in area than a disk-shaped or square piezoelectric element, an arrangement which is less advantageous as to size. It is preferable for a rectangular piezoelectric element to have a ratio between width and length not to exceed 1:2.

Figure 10:
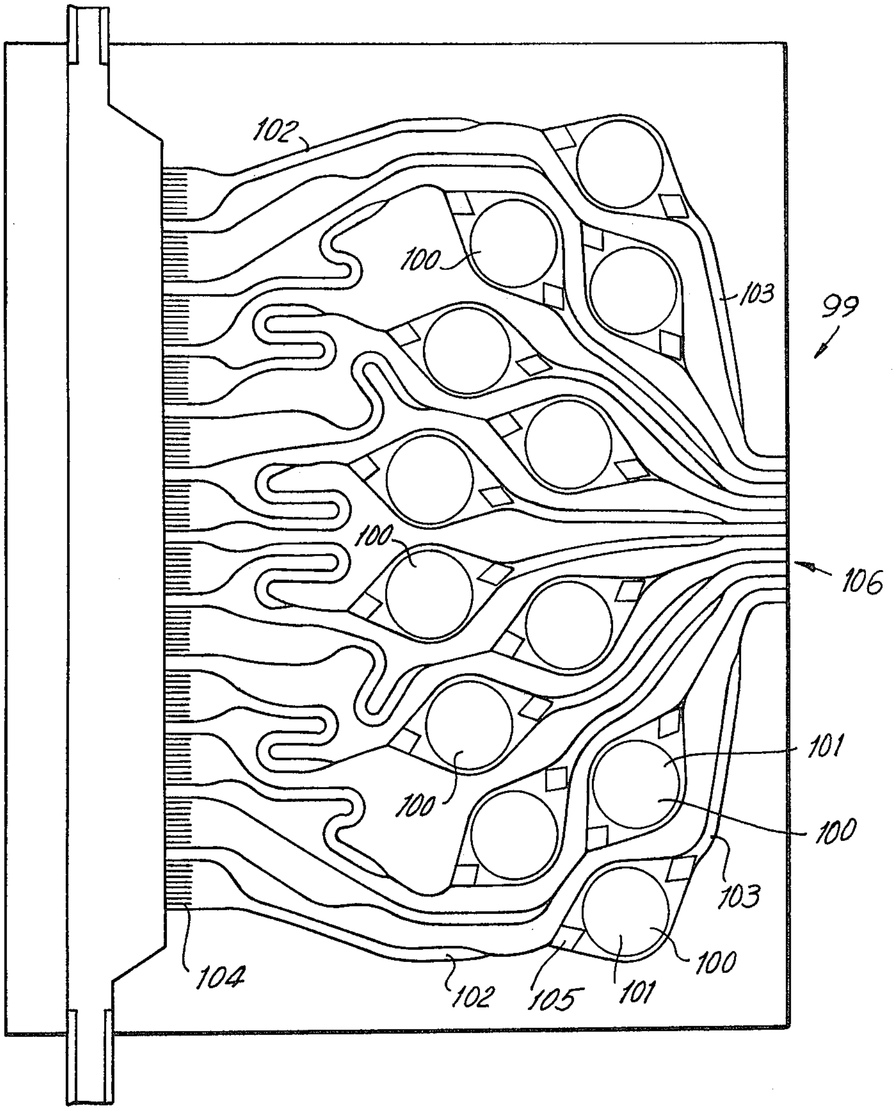
FIG. 10 is a top plan view of an ink jet print head having multiple nozzles to which the present invention is applied.

Referring now to FIG. 10, a print head, generally indicated at 99, is depicted. Print head 99 is constructed of glass and includes small-sized pressurization chambers in accordance with the present invention. In the arrangement shown, PZT piezoelectric elements 100 each have a radius a=1.25 mm and a thickness tp=0.15 mm. The print head is small-sized by combining alternating disk-shaped pressurization chambers 101 as illustrated. Print head 99 is dimensioned at 22 mm×18 mm×2 mm and has twenty-four nozzles 106 with twelve nozzles on each side of the print head. The inertance m and acoustic resistance r of supply passages 102 and outlet passages 103 which communicate with preesurization chambers 101 are substantially the same with the length, width and the line in view, to equalize the speed of ejection of ink, the diameters of ink droplets and the like for the respective nozzles. Filters 104 are provided for preventing dust from entering the print head. Lands 105 are also provided to insure that the flow of ink through pressurization chamber 101 is uniform, the lands being produced by etching simultaneously with the flow passages.

According to the present invention, a piezoelectric element having a reduced thickness tp can have a reduced area with no increase in the drive voltage caused thereby. While in the foregoing description PZT has been described as the most preferable piezoelectric material, other piezoelectric materials can be used for rendering print heads smaller in size based on the principles of the present invention.

The vibratory system of the present invention has been shown to comprise a single piezoelectric element and a single vibratory plate. However, it is possible to reduce the size of the print heaad by employing a vibratory system constructed of a plurality of piezoelectric elements such as a bimorph cell or by two vibratory systems disposed on both sides of the pressurization chamber.

Although in the embodiment described herein, printing is effected upon reduction of the volume of the pressurization chamber, it has been suggested to increase the volume of the pressurization chamber upon application of a print signal and then carrying out printing upon restoration of the volume of the pressurization chamber utilizing motion of the vibratory system or fluid. With such a proposed arrangement, it is possible to reduce the drive voltage less than that required for ink ejection effected directly by the volume reduction as described above. This application results in a radius a which is smaller than the aforementioned optimum value due to a reduction in the drive voltage.

As described above, according to the present invention, a vibratory system is provided which is suitable for a flow passage system to lower the drive voltage of the piezoelectric element, thereby allowing the piezoelectric element to be thinner and hence have a reduced area so that the overall area of the print head is substantially reduced, and the distance between the tip of the nozzle to its associated pressurization chamber can be reduced to lower the impedance of flow passages, thereby further reducing the drive voltage.

The present invention is also advantageous in that the piezoelectric element and, hence, the print head are small in size, the print head can be less costly manufactured, and a motor for moving the small-sized print head can be small in size and therefore less costly to manufacture. The print head of the present invention is useable in a wide variety of applications such as in a serial printer with compact multiple heads, a plotter, facsimile, and other types of printers.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. An ink jet print head for projecting droplets of ink on demand comprising a pressurization chamber including at least one wall, said wall defining a vibratory plate, a nozzle means open to said pressurization chamber and defining a fluid passage through which said ink is ejected, a piezoelectric element means operatively coupled to said vibratory plate, said piezoelectric element means altering the volume of said pressurization chamber when selectively energized by a drive voltage to eject ink through said nozzle means, said piezoelectric element means and said vibratory plate defining a vibratory system, the acoustic capacitance of said vibratory system being less than or equal to $9\times10^{-17}$ $m^5/N$ and such amount that a drive voltage V expressed by the following equation:

$$V = \sqrt{\frac{2\chi^2 C_o}{K^2 C_p}}$$

may be approximately minimum.

2. The ink jet print head as claimed in claim 1, wherein the acoustic capacitance of said vibratory system is greater than or equal to $1\times10^{-18}$ $m^5/N$.

3. The ink jet print head as claimed in claims 1 or 2, wherein said piezoelectric element means has a thickness no greater than 0.2 mm and an area no greater than $1.5\times10^{-5}m^2$.

4. The ink jet print head as claimed in claims 1 or 2, further comprising a plurality of said pressurization chambers and a plurality of said piezoelectric element means, each said piezoelectric element means being associated with one said pressurization chamber.

5. The ink jet print head as claimed in claims 1 or 2, wherein said piezoelectric element means has a thickness no greater than 0.2 mm and a radius no greater than 2.2 mm.

6. The ink jet print head as claimed in claim 5, wherein said piezoelectric element means has a thickness substantially equal to 0.2 mm and a radius greater than or equal to 1 mm.

7. The ink jet print head as claimed in claim 5, wherein the radius a of said piezoelectric element means is related to the thickness tp of said piezoelectric element means by the following equation, $0.074\sqrt{tp} \leqq a \leqq 0.16\sqrt{tp}$.

8. The ink jet print head as claimed in claim 5, wherein said piezoelectric element means is disk-shaped.

9. The ink jet print head as claimed in claim 5, wherein said piezoelectric element means is a substantially square plate.

10. The ink jet print head as claimed in claim 5, wherein the thickness tp of said piezoelectric element means is $0.1\text{ mm} \leqq tp \leqq 0.15$ mm and the radius a of said piezoelectric element means is less than or equal to 1.5 mm.

11. The ink jet print head as claimed in claim 5, wherein said piezoelectric element means is formed from PZT.

12. The ink jet print head as claimed in claim 5, wherein said piezoelectric element means has a thickness substantially equal to 0.15 mm and a radius greater than or equal to 0.9 mm.

13. The ink jet print head as claimed in claim 12, wherein the radius of said piezoelectric element means is substantially equal to 1.5 mm.

14. The ink jet print head as claimed in claim 5, wherein said piezoelectric element means has a thickness substantially equal to 0.1 mm and a radius between or equal to 0.7 mm and 1.6 mm.

15. The ink jet print head as claimed in claim 14, wherein the radius of said piezoelectric element means is substantially equal to 1.2 mm.

* * * * *